(No Model.)
A. F. ZIMMERLING.
GAS HEATING STOVE.
No. 442,300. Patented Dec. 9, 1890.
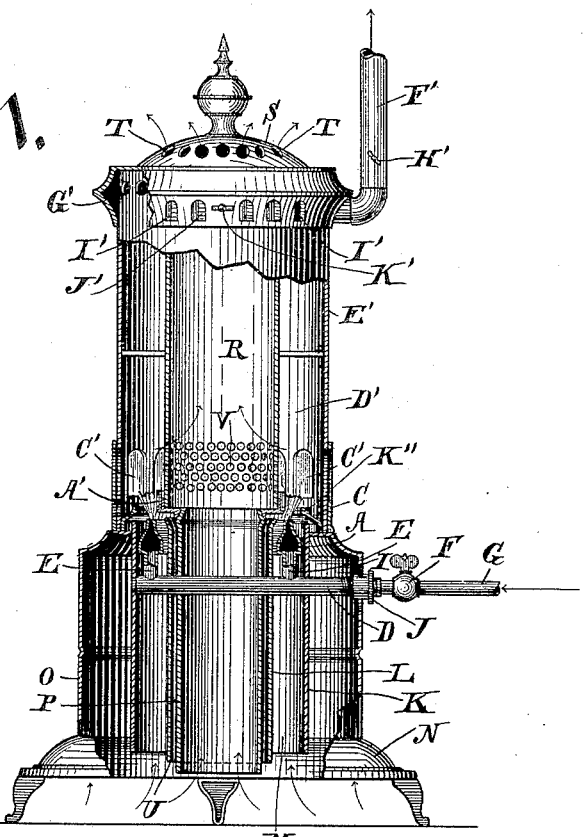
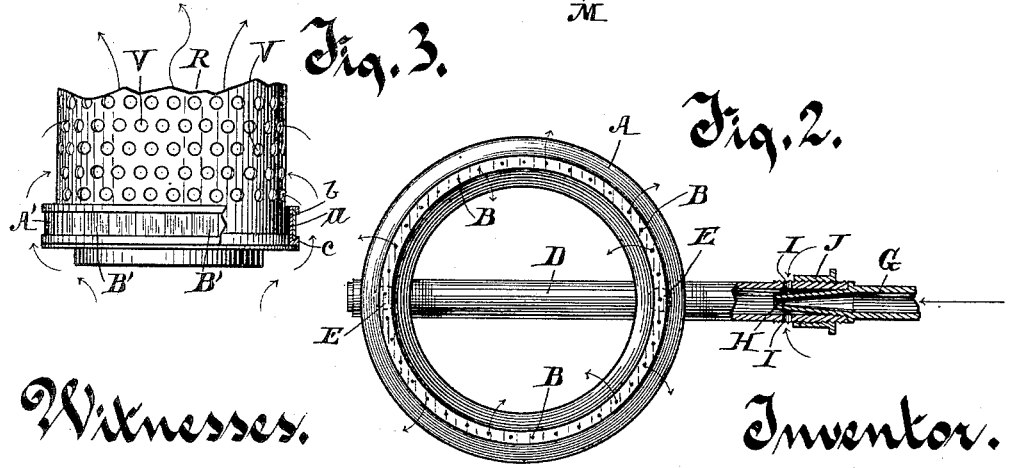
Witnesses.
C. H. Keeney.
Anna Faust.
Inventor.
August F. Zimmerling
By Enoix & Benedict
Attorneys.

UNITED STATES PATENT OFFICE.

AUGUST F. ZIMMERLING, OF JACKSON, MICHIGAN.

GAS HEATING-STOVE.

SPECIFICATION forming part of Letters Patent No. 442,300, dated December 9, 1890.

Application filed April 19, 1890. Serial No. 348,701. (No model.)

*To all whom it may concern:*

Be it known that I, AUGUST F. ZIMMERLING, of Jackson, in the county of Jackson and State of Michigan, have invented new and useful Improvements in Gas Heating-Stoves; and I do hereby declare the following to be a full, clear, and exact description of said invention, reference being had to the accompanying drawings, and to the letters of reference marked thereon, which form a part of this specification.

My invention relates to improvements in gas-stoves, and the construction is explained by reference to the accompanying drawings, in which—

Figure 1 represents a side view, part in section. Fig. 2 is a detail showing a top view of the gas retort or chamber and a vertical section of the inlet gas-duct leading to the retort; and Fig. 3 is a detail showing a side view of the central air-duct and a surrounding or annular reflector.

Like parts are represented by the same reference-letters throughout the several views.

A is an annular gas-retort, which is provided with a series of small apertures B through its upper surface, through which the gas escapes and at which point the combustion takes place within the combustion-chamber C. Gas is led from the gas supply or reservoir to the retort A through the horizontal pipe D and vertical ducts E E.

F is a gas-controlling valve through which communication from the supply is controlled. The gas in flowing from the duct G to the pipe D passes through a conical-shaped nozzle H, whereby the rapidity of its flow is increased as it enters said pipe D, and whereby exterior air is drawn into said pipe D through the air-inlet passages I I, which air is intermixed with the gas before it enters the combustion-retort A, thus securing the best pre-existing conditions for quick and complete combustion.

J is an annular valve, which is provided with a screw-threaded bearing upon the surface of the pipe D and is adapted to be screwed forward over the air-passages I I to close said air-passages for the purpose of producing a whiter flame, and it may be reversely screwed to open them for producing a blue flame.

The retort A is supported between two cylindrical drums or walls K and L at their upper ends, by which walls K and L an air-chamber M is formed, through which air rising from the base of the stove N passes upward and around the retort A and upon the respective sides of the flame at the upper surface of the retort, thereby promoting the combustion of the gas.

O is the body of the stove, which rests upon the base N and extends upward exterior to the central air ducts and drums, with and by which said drums and the gas pipes and retort are supported. Within the cylinder L is a smaller cylinder P, which communicates from the base N to the central upper chamber R within the combustion-chamber, whereby air is heated to a high temperature as it passes the combustion-chamber by its close proximity to the surrounding flame. It then passes out through the center of the dome or cover S of the stove through the apertures T into the room to be heated.

Between the cylinder P and the cylinder L is a narrow annular space U, through which a current of air is led upward into the combustion-chamber C upon the inner side of the flame, when it enters the drum R through the apertures V, from whence it escapes through the top of the stove into the room.

A' is a reflector, which consists of a metallic plate a, provided on its front surface with a downward-extending flange b and an upward flange c, which flanges serve to retain in place a series of pieces of isinglass B' B'. The outer surface of the annular plate a is highly polished, so that when covered by the isinglass it forms a mirror by which the light from the burning gas is reflected out through the windows or openings C', while the reflector A' as a whole, including the isinglass, serves to deflect the flame outward, as indicated, toward the center of the space D' between the cylinder or drum R and the inclosing wall or cylinder E'.

To provide for the escape of any odor that may arise from the combustion of the gas an escape-pipe F' is provided, which communicates with the air-space D' through the annular drum G'. To retain all the heated air within the room the damper H' is closed, so that it cannot escape through the pipe F', and the air is thereby caused to escape through the series of openings I' formed in the drum G'. The openings I' are provided with sliding doors J', which are controlled by the handle K', and to cause the air from the combustion-chamber of the stove to escape from the room the doors J' are closed and the damper H' is opened. To increase the brilliancy of the burning gas the upper surface of the burner-cone K'' is preferably polished.

Having thus described my invention, what I claim as new, and desire to secure by Letters Patent, is—

1. The combination, in a gas heating-stove, of an annular retort A, provided at its upper surface with a series of apertures B for the escape of the gas to be burned, inlet air-duct D, communicating from the supply with said retort, annular combustion-chamber C, inclosing said retort, central cylindrical chambers or drums P and R, communicating with each other within said annular retort A, exterior inclosing walls or drums K and E', forming an air-space from the base of the stove upon the respective sides of the retort to the dome or cover of the stove, whereby an upward current of air is brought in contact with and heated by the flame, exterior inclosing wall or body O, supporting-base N, said wall and base being adapted to support the inclosing air-ducts and chambers, together with the gas-retort and connecting-pipes, annular chamber G', inclosing the exterior wall or drum E', forming a communication between the air-duct D' and the escape-duct F', and perforated dome or cover S, communicating with the central drum or chamber R, all substantially as and for the purpose specified.

2. In a gas-stove formed substantially as herein described, the combination, with the central air-duct R, located within the inclosing annular retort A, of the reflector A', provided with a polished surface and retaining-flanges $b$ and $c$, and a series of transparent inclosing plates B', substantially as and for the purpose specified.

3. In a gas-stove, the combination of a supporting-base N, an exterior body O, interior concentric cylindrical drums K, L, and P, located at a distance from each other, forming air-passages between them, exterior drum E', drum R, provided with perforations V, and located within and at a distance from the drum E', the drums E' and R being located above and arranged to form continuous air-passages from the passages formed by the drums K, L, and P, and an annular gas-retort provided with gas-discharging apertures located near the upper ends of and between the drums K and L, substantially as described.

In testimony whereof I affix my signature in presence of two witnesses.

AUGUST F. ZIMMERLING.

Witnesses:
C. T. BENEDICT,
ANNA FAUST.